United States Patent

Chason et al.

[11] Patent Number: 5,912,738
[45] Date of Patent: *Jun. 15, 1999

[54] MEASUREMENT OF THE CURVATURE OF A SURFACE USING PARALLEL LIGHT BEAMS

[75] Inventors: Eric H. Chason, Sandia Park; Jerrold A. Floro, Edgewood; Carleton H. Seager; Michael B. Sinclair, both of Albuquerque, all of N. Mex.

[73] Assignee: Sandia Corporation, Albuquerque, N. Mex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,324
[22] Filed: Nov. 25, 1996
[51] Int. Cl.$^6$ ....................................................... G01B 11/24
[52] U.S. Cl. ............................................................ 356/371
[58] Field of Search ............................... 356/32, 371, 376

[56] References Cited

U.S. PATENT DOCUMENTS

| 4,291,990 | 9/1981 | Takasu | 356/371 |
| 4,929,846 | 5/1990 | Mansour | 356/371 |

OTHER PUBLICATIONS

Hammond et al., "Detecting Surface Deformities" *IBM Technical Disclosure Bulletin*, vol 14, No.1 (Jun. 1971) pp.49–50.

Mechanical Streeses in (Sub)monolayer Epitaxial Films, A. J. Schell–Sorokin and R. M. Tromp, *Physical Review Letters*, vol. 64, Number 9, Feb. 26, 1990, pp. 1039–1042.

*Primary Examiner*—Richard A. Rosenberger
*Attorney, Agent, or Firm*—Gregory A. Cone

[57] ABSTRACT

Apparatus for measuring curvature of a surface wherein a beam of collimated light is passed through means for producing a plurality of parallel light beams each separated by a common distance which then reflect off the surface to fall upon a detector that measures the separation of the reflected beams of light. This means can be an etalon and the combination of a diffractive element and a converging lens. The curvature of the surface along the line onto which the multiple beams fall can be calculated from this information. A two-dimensional map of the curvature can be obtained by adding a second etalon (or a second combination of a diffractive element and a converging lens) which is rotated 90° about the optical axis relative to the first etalon and inclined at the same angle. The second etalon creates an individual set of parallel light beams from each of the individual beams created by the first etalon with the sets of parallel light beams from the second etalon rotated 90° relative to the line onto which the single set of parallel beams from the first etalon would have fallen.

15 Claims, 3 Drawing Sheets

MEASUREMENT OF THE CURVATURE OF A SURFACE USING PARALLEL LIGHT BEAMS

GOVERNMENT RIGHTS

This invention was made with Government support under Contract DE-AC04-94AL85000 awarded by the U.S. Department of Energy. The Government has certain rights in the invention.

CROSS REFERENCE TO RELATED APPLICATIONS

None

BACKGROUND OF THE INVENTION

Measurement of the curvature of a surface for the purpose of determining stress levels therein has particular importance to microelectronic processing where thin films of dissimilar materials are emplaced atop each other. In some cases stress will build up because of the processing conditions, thermal expansion, or the mismatch of various characteristics of the different materials. This stress can cause delaminations and stress-related breakage of metal interconnects. Measurement of the curvature of the surface of these structures and test structures can be related to the stress levels in the structure according to the guidance provided in the literature, one reference being an article by P. A. Flinn, D. S. Gardner, and W. D. Nix "Measurement and Interpretation of Stress in Aluminum-Based Metallization as a Function of Thermal History" IEEE Trans. On Electron Devices, Vol. ED-34, No. 3, March 1987, pp. 689–699.

To date these measurements of the curvature of the surface have been made by rather complex machines that employ a single laser beam to scan the surface or a pair of laser beams. The scanning technique is subject to error due to vibrations of the system as the beam scans across the surface thereby introducing possible errors from point to point. Also, the difficult alignment and mechanical requirements of these systems make them difficult to use remotely, for instance they are unable to operate through a viewport in a microelectronic processing chamber. This undesirably adds another step to manufacturing process if one needs to measure stress levels.

BRIEF SUMMARY OF THE INVENTION

This invention is an apparatus for measuring the curvature of a surface which comprises means to produce a collimated beam of light that passes into means for creating multiple beams of light from the input beam that are parallel to each other and spaced apart by the distance d. This means can be either an inclined etalon or a diffractive element followed by a converging lens. These multiple beams fall upon and reflect off of the surface with the reflected beams falling upon a detector which measures the separation distance between the beams. Curvature of the surface leads to deflection of the beams and an increase or decrease in their spacing δd. The radius of curvature of the surface is a function of the distance d, the deflection δθ, the angle at which the beams intersect the surface and the distance between the surface and the detector, all of which are known or measured quantities. For a linear array of parallel beams, the curvature is thus measured along a single line. The invention also includes an apparatus to create a 2-dimensional array of beams so that a map of the curvature in two dimensions can be created. The second apparatus adds a second etalon or diffractive element/converging lens combination to the basic apparatus discussed above to create another set of parallel beams of light from each parallel beam created by the first etalon.

Although this invention is described below in the context of measurement of the curvature of wafers used in manufacturing microelectronic circuits and elements to determine the stress levels of the wafers, the application of the invention is not limited thereto. It is useful in the measurement of curvature in other thin film applications as well, such as optical coatings, magnetic materials and protective coatings, to name a few. Indeed, the apparatus is capable of measuring the curvature of any surface that reflects light. It could also be employed to analyze light beams that pass through a film if the simpler reflective measurement was infeasible.

DETAILED DESCRIPTION OF THE INVENTION

The technique described here uses the deflection of parallel beams of laser light to monitor wafer curvature with high sensitivity. Unlike previous approaches which scan a single laser beam across the surface of the film, this approach uses multiple parallel beams created from a single input beam. The multiple beams can be created either by an etalon or the combination of a diffractive element and a converging lens. The use of multiple parallel beams makes it possible to use a CCD camera for detection of the beam deflection instead of a position sensitive detector. Since all the beams are detected simultaneously, our approach is less sensitive to vibration and is more robust. In addition, use of two etalons rotated 90° to each other about the optical axis of the system (or two combinations of a diffractive element and a converging lens) creates a two dimensional array of beams from which a full surface profile of the curvature can be obtained.

Figure 1:
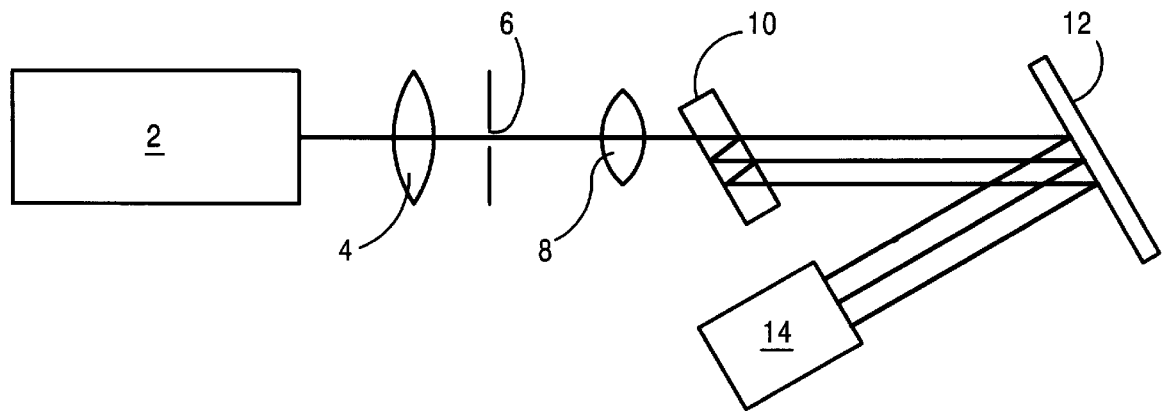
FIG. 1 is a schematic of the curvature measurement apparatus using a single etalon.

The apparatus layout for the single etalon embodiment is shown in FIG. 1. A linearly polarized laser 2 is preferably used as the light source although other light sources could also be used. Because the surfaces under consideration for this embodiment are highly reflective, a low power HeNe laser is sufficient for this particular application. The beam is passed through a spatial filter made of lens 4 and pinhole 6 to remove high frequency noise. The lens 8 after the filter recollimates the beam and focuses it on the CCD camera 14 at a distance of approximately 1.5 m after passing through the etalon 10 and reflecting off the sample surface 12.

Figure 2:
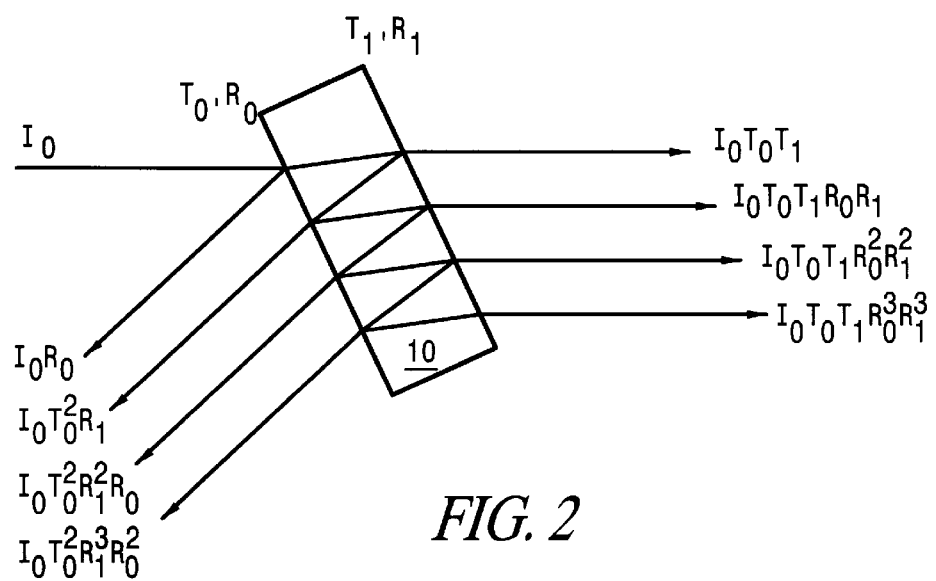
FIG. 2 is a diagram of the generation of the multiple parallel beams from the single etalon showing various transmission and reflections coefficients for the beams.

The optic element for creating multiple parallel beams is a 4 mm thick etalon 10 with 90% reflectivity coatings on both sides. The particular etalon used here is solid; other types may be useful in other applications. The surfaces of the etalon are parallel to within 1 arcsecond. By orienting this optic at a slight angle relative to the incoming beam, the internal reflections create multiple parallel beams both in the reflected and transmitted direction. The intensity of each transmitted beam is given by $$I = T_0 T_1 R_0^n R_1^n$$

where T and R are the reflectivity and transmission at each interface. The subscript 0 refers to the front interface and subscript 1 refers to the back interface. n is the order of the reflection, it is zero for the first beam, 1 for the second, etc. This is illustrated in FIG. 2.

Figure 3:
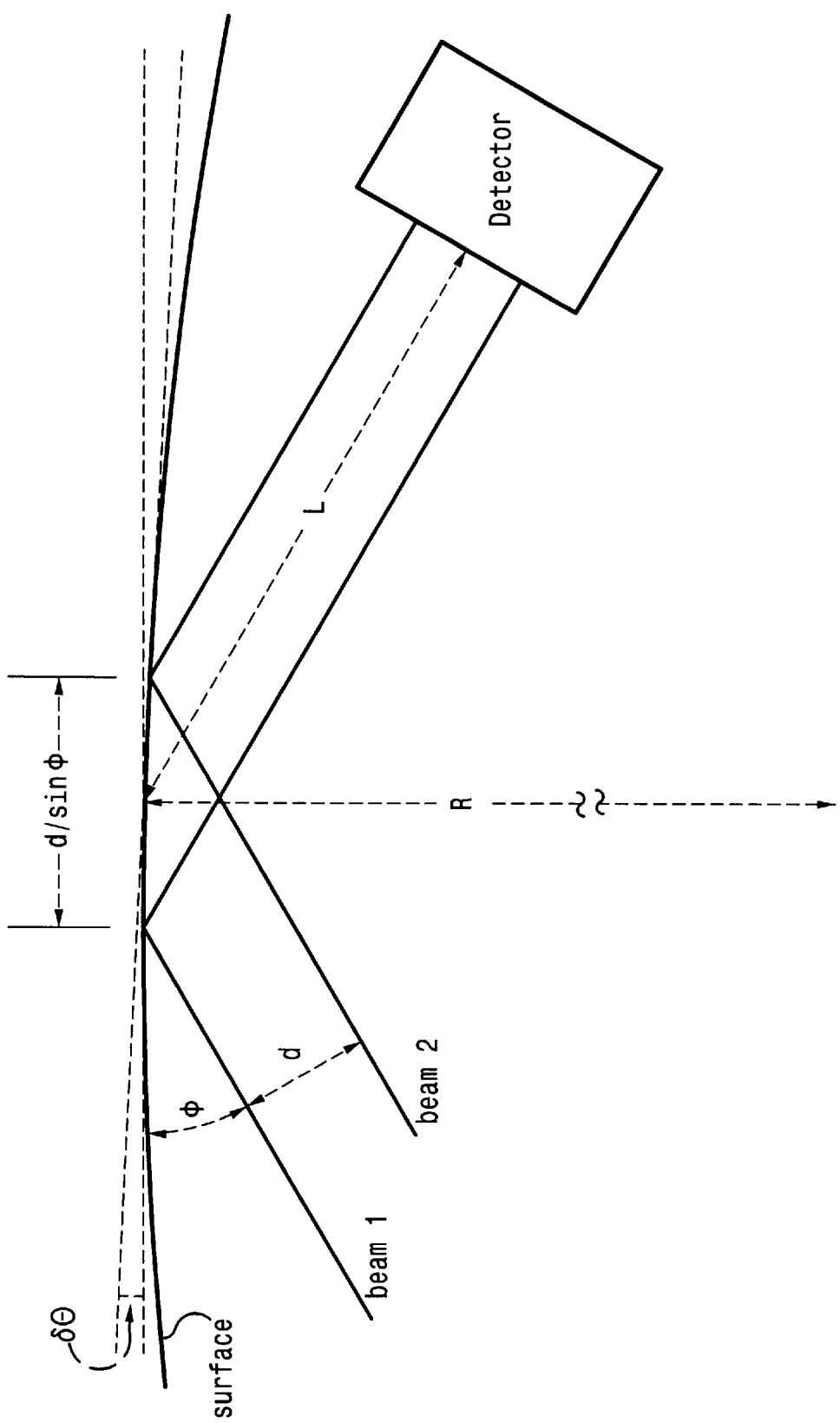
FIG. 3 is a diagram of the geometry of parallel beams reflecting from a curved surface.

The relation between the surface curvature and the deflection of the laser beam is shown in FIG. 3. R is the radius of curvature, L is the distance from the sample to the detector, d is the spacing between beam 1 and beam 2, and $\delta d$ is the deflection of the beam from its initial position measured as the angle between the two tangents to the surface drawn where beam 1 and beam 2 reflect off the surface. $\delta\theta$ is the angle of deflection of the beam due to the surface curvature. $\phi$ is the angle of incidence of the laser beam relative to the surface.

The angular deflection due to the surface curvature is $$\delta\theta = (d/\sin\phi)/R$$

and the spatial deviation of the deflected beam at the detector is $$\delta d = 2\delta\theta L.$$

The dependence of the curvature on the amount of deflection is then $$R = (2L/\sin\phi)/(\delta d/d)$$

The sensitivity to the radius of curvature is then determined by the resolution for the spotspacing measurement. For the CCD camera, the minimum $\delta d/d$ change is on the order of 0.02% which gives a maximum radius of curvature of approximately 10 km (when L is 1 m). Since the spacing d, the distance L, and the angle $\phi$ are known, it is a relatively simple calculation to find R. Having R, one can then calculate the stress in the surface by the teachings of the Flinn et al. article mentioned above.

Figure 4:
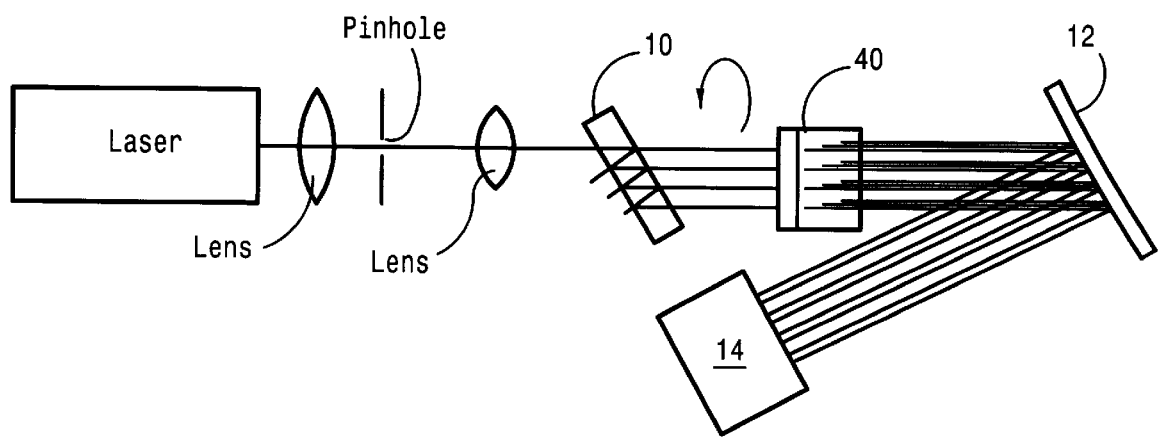
FIG. 4 is a schematic of the curvature measurement apparatus augmented with a second etalon for a two-dimensional representation of the surface curvature.

With this apparatus the curvature along one dimension can be determined. In some applications, it may be useful to determine a two-dimensional profile of the curvature of the surface. One such use would be to map the film stress. FIG. 4 provides a schematic layout of one embodiment of such a two-dimensional system employing a second etalon. The difference between this FIG. 4 and FIG. 1 includes the addition of a second etalon 40 rotated 90° about the optical axis of the system relative to the first etalon 10 and inclined at the same angle as the first. Other angular orientations are possible but would complicate the beam orientations and the resulting measurements. Each of the parallel beams created by the first etalon is turned into another parallel set of beams oriented orthogonally to the line onto which the parallel beams from the first etalon would fall. This creates a two dimensional array of beams 42 all parallel to each other as they leave the second etalon. The deflection of the beams in this array after reflecting off the surface can be measured by the CCD array detector 14, and a map of the curvature of the surface 12 can be produced. FIG. 4 describes but a single geometry for the two etalon version of the inventive apparatus. Other geometry's are possible and may be dictated by external physical constraints.

Figure 5:
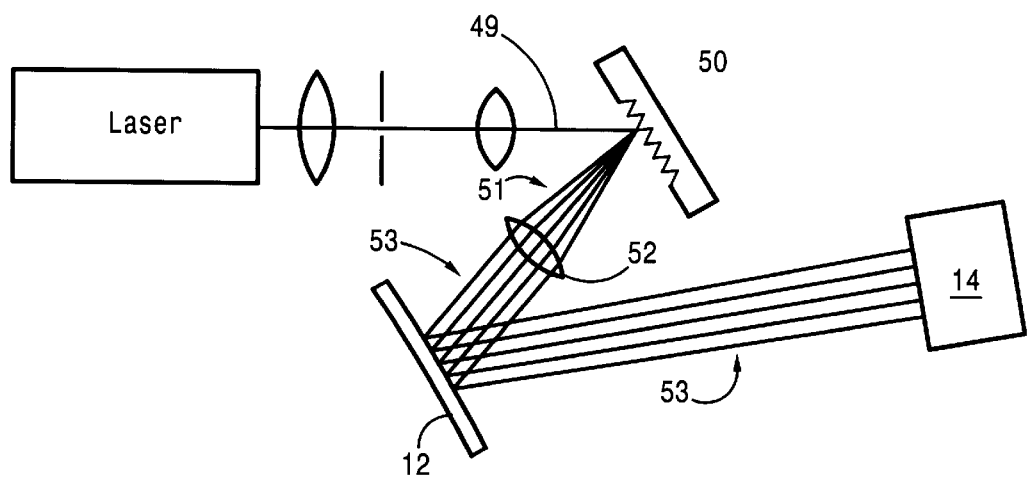
FIG. 5 is a schematic of the curvature measurement apparatus using a single diffractive element and a converging lens.

It is also possible to create the parallel beams from a single beam by using a diffractive element in combination with a converging lens. FIG. 5 illustrates one version of such an apparatus. The etalon in FIG. 1 has been replaced in FIG. 5 by a diffractive element, here a grating 50, and a converging lens 52. When the single beam 49 hits the grating, the light is diffracted into the various orders which leave the grating in the diverging array 51. The grating is shown in side view with the grooves or rulings perpendicular to the plane of the drawing. The diverging array is brought back into a parallel array 53 by the converging lens 52. The beams in the parallel array 53 have uniform spacing, d, as with the etalon embodiment discussed above. As with the etalon embodiment shown in FIG. 4, the diffractive element/coverging lens combination can also be employed to produce the two dimensional mapping by adding a second diffractive element/converging lens combination rotated 90° relative to the first combination to produce the two dimensional array of parallel beams of light. The second combination would be inserted into the beam line downstream from the converging lens 52 of the first combination and upstream from the sample 12.

This technique is different from beam scanning laser-based techniques for measuring wafer curvature because it has no moving parts. All the parallel beams are produced simultaneously by the etalon and no moving mirrors are required. All the beam optics (besides the detector) can be configured compactly in a small space that does not require complicated setup or focusing of the beams by a receiving lens. In addition, the alignment is simpler than techniques using a single beam and position sensitive detectors. Multiple beams provide a spatially resolved curvature profile that cannot be obtained from a pair of beams. Parallel detection using a CCD array allows imaging of the reflected beams and aids in focusing of the lenses.

Because all the beams are produced simultaneously, a CCD camera or other array detector can be used to measure the reflected beams simultaneously. Simultaneous detection makes the system less sensitive to vibrations than other techniques. Compact beam optics and simple detection make it possible to simply "bolt on" this system to an existing deposition apparatus with minor modifications.

In comparison with laser interferometry techniques that measure surface curvature, this system can be aimed remotely at a sample from a large distance (approximately 1 m) so that it can be used as an in situ process monitor. Small phase changes induced by imperfections in vacuum viewports can significantly disrupt laser interferometry but are not a significant problem with the present technique. Since in the present technique all the beams are measured together, small vibrations of the sample on its mount can be tolerated since this motion does not change the relative spacing of the reflected beams. With interferometry techniques, this vibration would significantly reduce the signal.

We claim:

1. An apparatus for quantitatively determining the curvature of a surface comprising:

means to produce a collimated beam of light;

first means to produce a first linear, identically spaced, parallel array of one-dimensional beams of light from the collimated beam of light;

a second means to produce a second two-dimensional, identically spaced parallel array of beams of light rotated 90° about an axis parallel to the beams in first linear array of beams, the second means being located to intercept the first array of beams of light and create the two dimensional array therefrom to fall upon and reflect off the surface; and detector means to measure the separation distances between the beams of light reflected from the surface, said curvature being determined as a function of changes in the separation distances of the two-dimensional array of beams where they fall upon the detector from their initial identical spacing.

2. The apparatus of claim 1 wherein the first means to produce a first linear, identically spaced parallel array of beams of light comprises a first etalon inclined at an angle to the collimated beam of light.

3. The apparatus of claim 1 wherein the first means to produce a first linear, identically spaced parallel array of beams of light comprises a first combinations of a diffractive element which spreads the collimated beam into at least two orders of diffracted beams and a converging lens which brings the diffracted beams into a parallel relationship.

4. The apparatus of claim 1 wherein the second means comprises a second etalon.

5. The apparatus of claim 1 wherein the second means comprises a second combination of a diffractive element and a converging lens.

6. An apparatus for quantitatively determining the curvature of a surface comprising:

means to produce a collimated beam of light;

first etalon to produce a first linear, identically spaced, parallel array of one-dimensional beams of light from the collimated beam of light;

a second etalon disposed across the first plurality of parallel beams of light emanating from the first etalon, the second etalon being disposed with its long axis rotated at a predetermined angle relative to the long axis of the first etalon thereby creating a two dimensional array of parallel identically spaced beams of light, the two dimensional array of beams of light then falling upon and reflecting off the surface; and detector means to measure the separation distances between the beams of light reflected from the surface, said curvature being determined as a function of changes in the separation distances of the two-dimensional array of beams where they fall upon the detector from their initial identical spacing.

7. The apparatus of claim 6 wherein the means to produce a beam of light includes a laser.

8. The apparatus of claim 6 wherein the means to produce a beam of light further includes a spatial filter.

9. The apparatus of claim 6 further including means to calculate the curvature of the surface as a function of the difference between the distance d and the measured separation distances.

10. The apparatus of claim 6 wherein the detector means comprises a CCD camera.

11. The apparatus of claim 6 wherein the angle of rotation is 90°.

12. The apparatus of claim 6 wherein the detector means comprises a two-dimensional array of detector elements.

13. The apparatus of claim 12 wherein the second etalon is inclined at the same angle as the first etalon.

14. The apparatus of claim 6 further comprising means to calculate the curvature of the surface in two dimensions as a function of the difference between the distance d and the measured separation distances between the beams in the two dimensional array of beams of light.

15. An apparatus for quantitatively determining the curvature of a surface comprising:

a single laser shining into means to produce a collimated beam of light;

a first combination of a first diffraction grating disposed across the beam of light and inclined at a first angle thereto to produce a first plurality of diffracted one-dimensional beams of light in a first plane which enters into a first converging lens to produce a first parallel array of beams of light;

a second combination of a second diffraction grating and a second converging lens disposed across the first plurality of parallel one-dimensional beams of light emanating from the first combination, the second diffraction grating being rotated 90° about an axis parallel to the first plurality of parallel beams of light thereby creating a two dimensional array of parallel identically spaced beams of light, the two dimensional array of beams of light then falling upon and reflecting off the surface; and detector means to measure the separation distances between the beams of light reflected from the surface, said curvature being determined as a function of changes in the separation distances from their initial identical spacing.

* * * * *